June 28, 1927.
C. C. MOORE
1,633,823
PROCESS OF SULPHURIZING, DEHYDRATING, AND DESULPHURIZING FRUIT
Filed Feb. 15, 1926
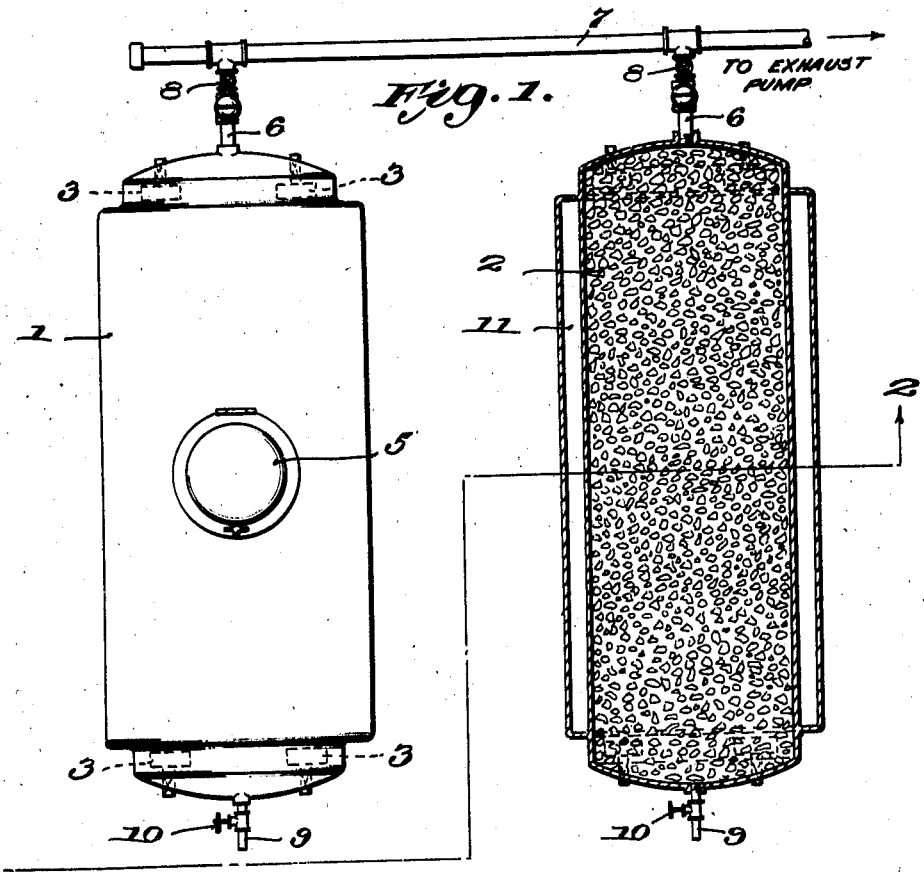
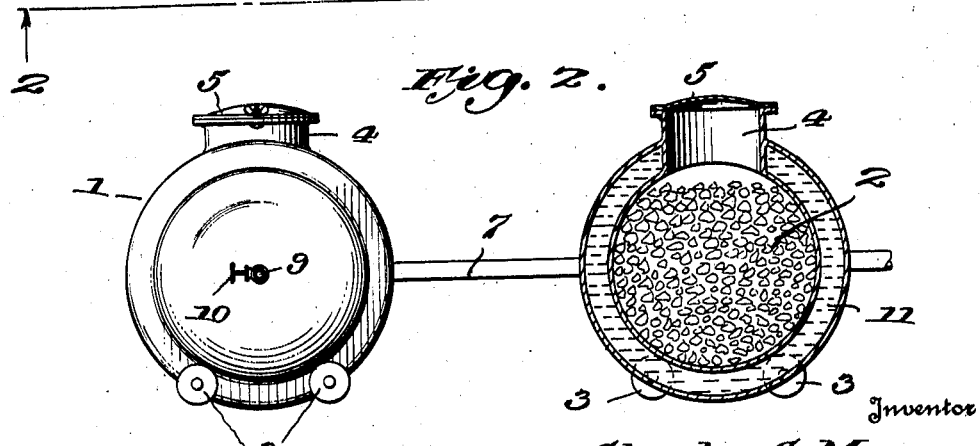
Inventor
Charles C. Moore,
By L. S. Underwood
Attorney Patented June 28, 1927.

1,633,823

UNITED STATES PATENT OFFICE.

CHARLES C. MOORE, OF SAN FRANCISCO, CALIFORNIA.

PROCESS OF SULPHURIZING, DEHYDRATING, AND DESULPHURIZING FRUIT.

Application filed February 15, 1926. Serial No. 88,204.

This invention relates to the treatment of fruits such as peaches and apricots, for preserving them as a dried product over a long period of time, and more particularly to the treatment of freshly-cut fruit with sulphur dioxide to arrest enzymic activity during dehydration, and the subsequent removal of substantially all or a part of the gaseous constituent thereby introduced into the fruit.

The object of the invention is to condition the fruit for easy handling and long preservation, and, at the same time, maintain its natural color and flavor.

This application is a continuation in part of my application filed August 18, 1924, for process of dehydrating vegetable material, Ser. No. 732,884.

The process is applicable to all those fruits in which enzymic action takes place when cut and exposed to the air, causing the fruit to darken in color, and by "fruit", as hereinafter used, is meant all products of vegetable growth in which such action takes place. In order to preserve such fruit for future use it has long been customary to cut the fruit into two or more parts and subject the same to the drying action of air, heated either naturally, as by the sun's rays, (commonly called "field drying") or artificially, (commonly called "dehydrating"), the term "dehydrating" being hereinafter used as a generic term to include both methods of drying. The effect of such exposure of cut fruit to the warm air is to dehydrate or reduce the moisture content thereof to a stage where it may be preserved over quite a long period. However, the dried fruit, after such treatment, loses its natural color to such an extent that it is darkened, and unattractive to the eye, because of which its market value is greatly depreciated. It was long since learned that this discoloration was the result of enzymic action which takes place in freshly-cut fruit and during dehydration or drying but not to any substantial extent in the dried fruit. It was also learned that such enzymic action could be arrested by subjecting the freshly-cut fruit, before dehydrating, to the action of a gas resulting from burning sulphur, chemically known as sulphur dioxide, or $SO_2$, and which will be hereinafter referred to by its chemical formula. By this process the natural color is retained in the dried fruit, but it has been found that such fruit contains $SO_2$ in such proportion, according to food experts, as to be unsuited to human consumption, for which reason some governments have made and are enforcing regulations requiring that the $SO_2$ content of food products shall not exceed 1,000 parts per million by weight. The process of sulphurizing fruit is necessary to give it market value, and no practical substitute for this process has been discovered up to this time, yet it necessarily results in a dried fruit having an $SO_2$ content greater than that above indicated. The problem presented by these conditions, therefore, was to secure the full benefit of sulphurizing and still produce a dried fruit with an $SO_2$ content below these limits, and this problem has remained without solution until I made my discovery to be now disclosed.

By chemical analysis of dried fruit, properly sulphurized before dehydrating, it may be found that it contains, ordinarily, from 3,000 to 5,000 parts per million, by weight, of $SO_2$. Immediately after the sulphurizing treatment the fresh fruit has a much greater content of $SO_2$ than after the dehydration has been completed. It might be supposed that, within a reasonable length of time, this gas would entirely disappear from the dried fruit, but such is not the case, as may be readily determined by chemical analysis. This is known as a fact, but in what manner or by what means the gas is held in the fruit is not known.

I have discovered that if fruit, which has been sulphurized and then dehydrated, is treated in vacuo, the $SO_2$ content thereof may be reduced in proportion to the time during which it is treated, and in proportion to the degree of vacuum employed. I have also discovered that this reduction in $SO_2$ content is expedited by increasing the temperature of the fruit during treatment, but in respect to this feature the temperature must be confined within limits hereinafter explained.

In order fully to explain the process, a suitable apparatus for carrying it out is diagrammatically illustrated in the accompanying drawings, in which;

Fig. 1, is a top view of two vacuum chambers, both connected to a vacuum line, the left-hand chamber being shown in top plan, and the right-hand chamber in section through its longitudinal axis, and, Fig. 2, is a view partly in end elevation and partly in section, on line 2—2, of Fig. 1.

Referring to the drawing in detail, in which the same number is used throughout to designate the same part, in carrying out my process, as I have practiced it, after the fruit has been sulphurized, and dehydrated, I place it in an airtight chamber 1, as indicated at 2. This chamber may be of any desired capacity and of any form, but I prefer to make it of cylindrical form as indicated, and support it on rollers 3, for rotation on a horizontal axis to facilitate the charge and discharge of the fruit, and also to stir the fruit while under treatment, for which purpose the rollers 3, may be slowly driven by any suitable gearing. Centrally of the side wall of the chamber I provide an opening 4, for inserting and withdrawing the fruit, closed by a door or cover 5, having an airtight joint. Preferably, I use a series of chambers, each of which is provided with a pipe 6, entering the end of the chamber and communicating with a vacuum line 7, to which, in turn, is connected an air pump for evacuating the line. In each of the pipes 6, I place a cock 8, for closing the pipe when the chamber is to be emptied or refilled. The opposite end of the chamber is furnished with a pipe 9, having a cock 10, which, when opened, permits normal pressure to be restored in the chamber 1, as a preliminary to removing the door 5. Surrounding the chamber 1, is an annular chamber 11, forming a water jacket therefor, for a purpose hereinafter described.

In the practice of my process I open the door 5, of the chamber 1, fill the same with the dried sulphurized fruit, and close the door, thus making the chamber air tight, the cock 10, at this time being closed. The cock 8, is then opened to the vacuum line by which the pressure in the chamber is reduced to any desired extent, and this reduced pressure is maintained for a length of time necessary to reduce the $SO_2$ content to the extent desired. The time required to reduce the $SO_2$ content will depend upon the amount of $SO_2$ contained in the dried fruit, the degree of vacuum maintained, and the temperature of the water in the water jacket 11. That is, with other factors the same, the time of reduction will be shortened by decreasing the pressure, or, with other factors the same, the time may be shortened by increasing the temperature of the fruit during treatment, and the time may be further shortened by decreasing the pressure and simultaneously increasing the temperature. The $SO_2$ content may be reduced or substantially removed without the use of the water jacket, but I have found that by increasing the temperature of the fruit during treatment the time required for reducing the $SO_2$ content is greatly shortened. However, inasmuch as fruit sugars, such as fructose, which are found in such dried fruit, are changed to sugars of a different and undesirable kind at a temperature of about 80° C. or above, it is desirable to maintain the fruit while under treatment below this temperature, for which reason I maintain a temperature in the water jacket of about 70° to 75° C. Without the use of the water jacket I have found it possible to reduce the $SO_2$ content of the fruit to a desired extent but only after prolonged treatment; by using such a water jacket maintained at a temperature indicated I have found that the time required is greatly lessened. Specifically, by maintaining a vacuum of about 25 inches and with a temperature in the water jacket as indicated, I have reduced, in from 4 to 5 hours, an $SO_2$ content of about 4,000 parts per million, by weight, to less than 1,000 parts per million, which is sufficient to meet the present known food regulations of any government. If it were found to be desirable, the $SO_2$ content could be further reduced by extending the time of treatment.

Fruit which has been dried sufficiently for commercial purposes, commonly referred to as "dried" fruit or "commercially-dried" fruit, ordinarily contains about 20% of moisture. After being subjected to treatment according to my process it may be lowered a further 3 or 4% moisture, as I have found by experiments. If this loss is considered of any moment, it may readily be restored, and even increased to an desired extent, by simply shutting off the vacuum line after the treatment is completed and admitting water vapor into the chamber, or water vapor and air, until a desired weight increase is obtained.

It is now the common practice for growers to sulphurize their fruit, dehydrate it, and then ship it to the packer. Such fruit, even months after it has been commerically dehydrated, may be desulphurized in the manner above disclosed with a resulting product having its natural color and flavor. Inasmuch as the presence of too much $SO_2$ in the dried fruit is objectionable, as above explained, it is also common to restrict the amount of sulphur used in sulphurizing, with the result that it is more difficult to dehydrate and is very often discolored. When my discovery is utilized an excess of $SO_2$ is not objectionable, in consequence of which there is no necessity to restrict the amount of sulphur used, and the sulphurizing step therefore may be carried out without the exercise of caution otherwise necessary, and dehydration may be more quickly and cheaply effected, supposedly because the fruit cells are made more porous by the action of the $SO_2$ when employed in sufficient quantity. Thus a step which is old in itself is modified in practice, for which reason I claim the process as a whole, or the continuous process, beginning with the cutting and sulphurizing of the fruit. In accordance with my invention the whole process of cutting, sulphurizing, dehydrating, and desulphurizing the fruit may be carried out in the space of 36 hours, making the product ready for the consumer, free of the objectionable $SO_2$.

In order to emphasize the importance of my process, attention is directed to the fact that ripe apricots and peaches have a natural color which may properly be called "golden", the presence or absence of which in the fruit when dried, is a very important factor of marketability. No practical method has been discovered to retain the color except by the sulphurizing process above described. If a quantity of $SO_2$ sufficient to maintain this color has been used, the dried fruit will contain a much greater $SO_2$ content than is considered desirable for human consumption. If, in order to keep the $SO_2$ content within desirable limits, insufficient sulphur is used in the sulphurizing process, the purpose for which such process is used is practically defeated, as the natural fruit color will be lost, and the period for dehydration will be extended with a corresponding increase in cost. Therefore what seems obviously necessary to meet the problem, and which has been solved by my process, is to utilize, to its greatest extent, the advantage resulting from the use of $SO_2$ to arrest enzymic action in the fresh fruit and during dehydration and assist dehydration, (which necessarily results in an excess of $SO_2$), and to reduce its content thereafter when it is no longer required for the purpose for which it was used In the above description of my process it has been assumed that the sulphur dioxide with which the fruit is treated in the sulphurizing process exists and is retained in the dried fruit in the same chemical combination. But whether it so exists or whether it is combined with something else, has, so far as I know, never been determined. But I know it to be a fact that sulphur dioxide is taken from the dried fruit by my vacuum treatment. Therefore I wish it to be understood that my invention is not to be restricted by any theory as to whether, in the dried fruit, the gas exists in a free state or has entered into a combination which is disassociated when subjected to vacuum treatment.

From the above description it will be clear that I have devised methods for the treatment of fruit of the character indicated which will result in a dried fruit having its natural color and flavor but free from a deleterious amount of $SO_2$, and which may be kept in such condition for a long period of time. The different factors of the process may be varied in degree, and substitutions may be made without departing from the principles above described. It is, therefore, to be understood that my invention is not to be confined to the details disclosed but includes all departures therefrom falling within the terms of the appended claims.

I claim:

1. A process of desulphurizing fruit which has been sulphurized while fresh for the purpose of arresting enzymic action during dehydration which consists in subjecting the sulphurized dried fruit to a vacuum of about 25 inches for a period of from three to six hours.

2. A process of desulphurizing fruit which has been sulphurized while fresh for the purpose of arresting enzymic action during dehydration which consists in subjecting the sulphurized dried fruit to a vacuum of about 25 inches for a period of from three to six hours, while heated to a temperature of about 70° to 75° C.

3. A process of desulphurizing fruit which has been sulphurized while fresh for the purpose of arresting enzymic action during dehydration which consists in subjecting the sulphurized dried fruit to a vacuum of from 15 to 25 inches for a period of from two to eight hours.

4. The process of treating fruit which, when cut, undergoes enzymic action, causing it to darken in color, which consists in subjecting the freshly cut fruit to sulphur-dioxide until it becomes substantially saturated therewith, drying the same to a point where it is preserved, and then subjecting it to a vacuum of from 15 to 25 inches for a period of from two to eight hours.

In testimony whereof I affix my signature.

CHARLES C. MOORE.